3,196,619
METHOD FOR DISPOSING OF HARMFUL
ORGANIC WASTE MATERIALS
D'Arcy A. Shock, Ponca City, Okla., assignor to Continental Oil Company, Ponca City, Okla., a corporation of Delaware
No Drawing. Filed Apr. 19, 1961, Ser. No. 103,963
10 Claims. (Cl. 61—36)

This invention relates to the disposition of harmful organic waste materials. More particularly, but not by way of limitation, the invention relates to a method by which organic waste materials may be permanently disposed of in an inaccessible and therefore relatively safe, location.

A number of highly toxic, predominantly organic waste materials are produced in certain chemical industries. Many of these materials have no further usefulness, or else cannot be economically reclaimed. In such cases, the industry is confronted with a difficult problem of disposing of these wastes in a permanent, safe manner.

The present invention contemplates the provision of a method by which predominantly organic waste materials of a highly toxic or noxious nature, such as mustard gases, nerve gases, harmful biological agents, phenols and the like, may be permanently disposed of in a safe manner. Basically, and in its broadest aspect, the method comprises the mixing of a toxic organic waste material with an oil base, fluid material which is compatible with the waste material, and which forms a pumpable slurry therewith. The oil base material contains appropriate gelling agents to impart thixotropic properties to the slurry, or at least to assure that the mixture will set up to a solid state upon standing. The slurry may thus be transported to, and allowed to solidify in, a location which is inaccessible to human and animal life, and which is isolated from contact with useful mineral deposits. The physical and chemical properties of the slurry are such that underground cavities may be utilized for the permanent disposition of the material if desired.

In another of its aspects, the invention comprises a novel composition of matter which functions as a vehicle for permanently storing harmful, organic waste materials in a safe location.

The major and most important object of the invention will thus be seen from the foregoing discussion to be that of safely and permanently disposing of harmful waste materials of a predominantly organic character.

It is a related object of the invention to accomplish the disposal of such organic waste material in an economical manner.

An additional object of the invention is to provide a method of disposing of organic waste material which may be practiced utilizing readily available materials and devices.

A further object of the invention is to provide a novel composition of matter which will effectively function as a vehicle for permanently fixing harmful organic waste material in a safe location.

A further object of this invention is to provide a method for permanently storing harmful organic waste material in a subterranean depository.

These objects, as well as other objects and additional advantages of the invention, will be clearly understood from the following disclosure.

The basic concept underlying the present invention is the provision of a medium in which the organic waste material may either be dissolved or suspended, and the imparting of coagulating properties to the solution or slurry so formed. I have found that a suitable, relatively inexpensive medium which may be employed is a material having properties similar to the properties of a high solid content, oil base drilling mud of the type used in drilling oil and gas wells. The oil base of the material assures sufficient compatibility with the organic waste materials that these waste materials will mix homogeneously with the base and other constituents of the mixture without appreciable settling out of solid components or formation of markedly immiscible phases.

In order to impart the necessary coagulating properties to the slurry which is formed upon mixing, a suitable coagulant or gelling agent is added to the oil base, either before or after the addition of the organic waste material. In a preferred embodiment of the invention, the gelling agent is one which renders the slurry thixotropic, and is added to the oil base just prior to the time when the waste material is to be added thereto. The mixture of the oil base carrier fluid and gelling agent is agitated prior to and during the addition of the organic waste material, and is then immediately pumped or otherwise transported to a situs where it may be permanently disposed of in a safe manner. Due to the thixotropic property of the slurry, it will solidify upon standing quiescently at the disposal location so that the toxic material is immobilized and permanently entrapped therein.

It will, in most cases, be desirable to adjust the viscosity, total solids content, and gell strength of the slurry as dictated by the nature of the organic material to be disposed of, the disposal location to be employed, and perhaps the time required for the slurry to be transported to such location. For the purpose of adjusting viscosity and total solids content, I have found that the materials commonly used in drilling fluid technology may be advantageously employed as additives. Such materials include calcium carbonate, barite, bentonitic and natural clays.

After a slurry containing the waste material and having the desired viscosity and gelling properties has been prepared, this mixture may be pumped by way of a suitably located well into a subterranean permanent storage reservoir. This subterranean disposal situs may comprise a salt deposit, a solution cavity or an artificial fracture therein or in other suitable formations which have a low porosity. The disposal situs may also be a mined cavity, for example, a salt deposit. If the formation is porous, preferably the cavity is first lined with a liner such as concrete, asphalt, or a plastic material which is inert to the organic waste. Selection of the disposal situs will depend upon the nature of the waste, and perhaps upon the topography of the terrain overlying such subterranean disposal situs. If the waste material is very highly toxic and a substantial amount of percolating ground waters can be anticipated, it will probably be advantageous to artificially fracture an impermeable formation and seal the solidified slurry in the fracture after it has been injected thereinto.

In artificially fracturing such an impermeable formation, a well is first drilled from the surface to pass through the formation. The formation is next isolated by cementing procedures and is then perforated by a suitable method such as, for example, gun perforation. In most instances, it will be found desirable to isolate this perforated zone with packers. Once the formation has been perforated, the fracture of the formation is commenced and propagated by injecting fluid under high pressure into the perforations via the well. The slurry containing the organic waste material may be utilized as the fracturing fluid if desired. When the hydrostatic pressure imposed upon the fracturing fluid exceeds the formation breakdown pressure, the formation will part or fracture. Since the pressure of the fracturing fluid ceases to rise when the formation breakdown pressure is reached, fluid pressure measurements at the surface will indicate when that point has been reached.

In order to ascertain the extent of the fracture, as well as to subsequently check upon the progress of injection of the waste-containing slurry, a plurality of check wells may be located around the injection well at varying distances. After the fracture has been filled with the waste-containing slurry, the fracture may be sealed by a suitable material such as cement, or even with the slurry unmixed with the waste material. Also, it may be desirable to repeat the fracturing and slurry injection at several different levels in the same impermeable formation.

If, on the other hand, the waste material is a type which is not easily leached from the solidified slurry, or which is leached only in amounts so small that no danger of serious contamination of surrounding mineral deposits exists, naturally occurring cavities in permeable formations may be used. Should the waste material contain components having radioactive properties, due consideration must, of course, be given to proper shielding and to heat buildup. The technique of "walling off" or isolating the solidified mass containing the waste material by both preceding and following it with a solidifying waste-free material may frequently be used to good advantage, as may the strategic location of check wells around the injection well.

As has been indicated above, the desired properties of the medium which is to be used as the carrier or vehicle for entrapping and carrying the waste material are found to characterize some of the oil base drilling muds now in use. For example, an oil base mud of the following composition may be made up and will effectively serve as a thixotropic vehicle for most predominantly organic waste materials.

*Composition of 1.085 barrels of oil base mud*

| Material | Pounds | Gallons | Percent by Volume |
|---|---|---|---|
| Blend of Blown Asphalt and Diesel Oil | | 42.000 | 92.18 |
| Solid Sodium Chloride | 1.14 | 0.050 | 0.11 |
| Water added to Sodium Chloride | 3.43 | 0.412 | 0.90 |
| Solid Sodium Hydroxide | 0.98 | 0.037 | 0.08 |
| Water added to Sodium Hydroxide | 0.98 | 0.118 | 0.26 |
| Sodium Silicate, N Brand | 14.35 | 1.235 | 2.70 |
| Tall Oil | 14.35 | 1.723 | 3.77 |
| Total | 35.23 | 45.575 | 100.00 |

Excessive amounts of water over that specified should be avoided to prevent development of distinct and clear-cut phases in the slurry.

The blown or oxidized asphalt-diesel oil blend will ordinarily be commercially obtained since these materials are rather difficult to blend. Also, their relative proportion has not been specified above, since in the commercial blends it varies between 17 and 20 percent asphalt, and between 80 and 83 percent diesel oil (both by weight), depending upon the temperature at which the blend is to be used.

The sodium silicate utilized is that which is sold under the trade name "N Brand" and comprises 8.9 percent by weight sodium oxide, 28.7 percent by weight silicon dioxide and the balance water.

In preparing an oil base, waste disposal vehicle of the above composition, the salt and caustic are first dissolved in their respective amounts of water. The sodium chloride solution is then added to the asphalt-diesel oil blend, followed by addition of the caustic solution, the sodium silicate solution, and the tall oil, in that order. The gelling or coagulating properties of the final slurry are derived from the thick, gelatinous metallic soap which is produced by the reaction of the tall oil with the sodium silicate and caustic solution. This soap also emulsifies the oil and small amount of water present, and the ability of the slurry to retain solid material in suspension is in turn primarily dependent upon the strength of this emulsion.

After the oil base material of the above-described composition has been prepared and thoroughly mixed in a suitable tank, solid particulate material is added to the mixture to raise the viscosity to the desired value. The particulate material which is added may conveniently be one of the materials commonly used as a weighting material in drilling mud, such as calcium carbonate flour, barites, and suitable clay solids. The viscosity to which the mixture is raised will vary somewhat, depending upon pumping conditions, but ordinarily, the maximum viscosity which may be attained commensurate with the maintenance of the mixture in a pumpable state is the value which is most desirable. If the organic waste material which is to be disposed of contains only a slight amount of solids, the viscosity may be increased above that required to maintain pumpability, and the addition of the predominantly liquid waste material depended upon to bring the viscosity down to a value which permits the final slurry to be readily pumped.

After the viscosity is brought to the desired level, the toxic waste material is blended in quickly, mixed thoroughly and pumped to the point selected for ultimate permanent disposal. As an alternative to this procedure, it may be desirable in some instances to blend in the waste material prior to the addition of the viscosity-increasing material. In this manner, the final viscosity may be more accurately adjusted.

Other types of oil base drilling muds are adequate for the disposal of many types of organic waste materials, and some of these are commercially available in ready-to-mix form. In other instances, suitable vehicles may be easily prepared with the quantities and quality of the ingredients varied according to types of organic chemicals in the waste, the solids content of the waste and other factors.

Subject matter related to the subject matter of the present application is contained in co-pending applications Serial No. 784,385, filed December 31, 1958, now abandoned; Serial No. 88,246, filed February 24, 1961; and Serial No. 30,988, filed May 23, 1960, now Patent No. 3,108,439, all assigned to the assignee of the present application.

Having now described the invention, many ramifications and modified embodiments will readily occur to those skilled in the art. Insofar as such variations do not depart from the spirit and scope of the invention described in this application, they are intended to be embraced by the appended claims in their broadest construction.

I claim:

1. A method of treating harmful organic waste material for safe and intentional disposal of same which comprises entrapping said waste in a solid state by the steps of mixing the waste material with an oil base, thixotropic fluid which is compatible therewith; and disposing of the mixture in an inaccessible subterranean location other than a well being treated to restore lost circulation and allowing same to solidify.

2. A method of treating harmful organic waste material for safe and intentional disposal of same which comprises entrapping said waste in a solid state by the steps of mixing the waste material with an oil base, thixotropic fluid having a gelling agent which is compatible with said waste material dispersed in a suitable oil carrier fluid which is compatible with the gelling agent and with the waste material to be disposed of; and disposing of the mixture in an inaccessible subterranean location other than a well being treated to restore lost circulation and allowing same to solidify.

3. A method of treating harmful organic waste material for safe and intentional disposal of same which comprises entrapping said waste in a solid state by the steps of mixing the waste material with an oil base drilling mud which is compatible therewith; and disposing of the mixture in an inaccessible subterranean location other than a well being treated to restore lost circulation and allowing same to solidify.

4. A method of treating harmful organic waste material for safe and intentional disposal of same which comprises entrapping said waste in a solid state by the steps of mixing the waste material with an oil base, thixotropic fluid which is compatible therewith; fracturing a subterranean impermeable rock formation; injecting said mixture into said fracture; and retaining the mixture quiescent in the fracture, whereby the mixture solidifies in said fracture.

5. A method of treating harmful organic waste material for safe and intentional disposal of same which comprises entrapping said waste in a solid state by the steps of mixing the waste material with an oil base, thixotrpoc fluid which is compatible therewith; adjusting the viscosity of said mixture to obtain the maximum viscosity commensurate with the maintenance of the mixture in a pumpable state; pumping said mixture to an inaccessible subterranean location other than a well being treated to restore lost circulation; retaining said mixture quiescent until it solidifies whereby said waste material is immobilized and permanently retained at said inaccessible location by entrapment in said solid.

6. The method for the safe disposal of harmful organic waste claimed in claim 2 wherein said oil carrier fluid is a blend of diesel oil and oxidized asphalt, and wherein said gelling agent comprises a metal soap.

7. A method of treating harmful organic waste material for safe and intentional disposal of same which comprises entrapping said waste in a solid state by the steps of mixing the waste material with an oil base, thixotropic fluid which is compatible therewith; adjusting the viscosity of said mixture to obtain the maximum viscosity commensurate with the maintenance of the mixture in a pumpable state; pumping said mixture into a subterranean cavity other than a well being treated to restore lost circulation; retaining said mixture quiescent until it solidifies, whereby said waste material is immobilized and permanently retained in said subterranean cavity by entrapment in said solid.

8. A method of safely and permanently intentionally disposing of harmful organic waste material by entrapping and fixing same in a safe underground disposal reservoir which comprises preparing an oil base fluid carrier which is compatible with said waste material and which sets up to a hardened state upon standing; adjusting the viscosity of the oil base fluid to the maximum viscosity which may be obtained while maintaining pump-ability; thoroughly mixing said oil base fluid with said waste materials; pumping the mixture into a subterranean cavity other than a well being treated to restore lost circulation; and retaining the mixture quiescent in said cavity until it sets up to a hardened state.

9. A method of disposing of harmful organic waste material for safe and intentional disposal of same which comprises entrapping said waste in a solid state by the steps of mixing the waste material with a compatible oil base fluid which solidifies upon standing; providing a well bore, other than a well being treated to restore lost circulation, communicating with a subterranean cavity; injecting said mixture into said cavity via said well bore while said mixture is in a flowable state; retaining the mixture quiescent in said cavity whereby said mixture solidifies in said cavity.

10. The method for the safe disposal of harmful organic waste claimed in claim 8 wherein said subterranean cavity is formed by fracturing an impermeable rock formation.

References Cited by the Examiner
UNITED STATES PATENTS

| | | | |
|---|---|---|---|
| 1,398,613 | 11/21 | Watson | 106—202 |
| 2,430,039 | 11/47 | Anderson | 252—8.5 |
| 2,461,483 | 2/49 | Self | 252—8.5 |
| 2,918,717 | 12/59 | Struxness et al. | 210—24 X |

OTHER REFERENCES

Composition and Properties of Oil Well Drilling Fluids, Rogers, First Edition, 1948, Gulf Publishing Co., Houston, Texas, pp. 387–416 and 442–466.

Lost Circulation in Rotary Holes, a Problem Requiring Specific Treatment, Sawdon, The Petroleum Engineer, February 1936, pp. 27–30.

Drilling Fluid Technology, Uren, The Petroleum Engineer, November 1942, pp. 43, 44, 46, 49, 51 and 52.

Circulation Losses, Silent, The Oil and Gas Journal, May 21, 1936, pp. 72, 75 and 78–80.

Lansing et al.: Engineering Bulletin, Purdue University, vol. XXXIX, No. 2, March 1955, pp. 185–194.

Roedder: Atomic Waste Disposal by Injection Into Aquifers, Proceedings of the Second Nuclear Engineering and Science Conference, Pergaman Press, New York 1957, Part I, pp. 359–371.

MORRIS O. WOLK, *Primary Examiner.*

CARL F. KRAFFT, *Examiner.*